(12) United States Patent
Natarajan et al.

(10) Patent No.: US 7,156,723 B2
(45) Date of Patent: Jan. 2, 2007

(54) METHOD AND APPARATUS FOR NON-INTERRUPTED GRINDING OF RAILROAD CROSSING AND MAIN LINE TRACK

(75) Inventors: Balasubramanian Natarajan, Maple Grove, MN (US); Jon Thomas Behrens, St. Michael, MN (US)

(73) Assignee: Loram Maintenance of Way, Inc., Hamel, MN (US)

( * ) Notice: Subject to any disclaimer, the term of this patent is extended or adjusted under 35 U.S.C. 154(b) by 0 days.

(21) Appl. No.: 10/281,057

(22) Filed: Oct. 25, 2002

(65) Prior Publication Data

US 2003/0083001 A1 May 1, 2003

Related U.S. Application Data

(60) Provisional application No. 60/345,288, filed on Oct. 25, 2001.

(51) Int. Cl.
*B24B 7/00* (2006.01)
*B24B 23/00* (2006.01)
*B07B 13/04* (2006.01)

(52) U.S. Cl. .................. 451/65; 451/347; 705/417
(58) Field of Classification Search .............. 451/57, 451/347, 65, 360, 362, 363, 178, 236; 705/34, 705/417
See application file for complete search history.

(56) References Cited

U.S. PATENT DOCUMENTS

| 2,132,470 | A |   | 10/1938 | Hobson et al. |
| 2,197,729 | A |   | 4/1940 | Miller |
| 3,526,997 | A | * | 9/1970 | Panetti ........................ 451/347 |
| 3,606,705 | A |   | 9/1971 | Rivorire |
| 3,707,808 | A |   | 1/1973 | Danko et al. |
| 4,115,857 | A |   | 9/1978 | Panetti |
| 4,178,724 | A |   | 12/1979 | Bruno |
| 4,189,873 | A |   | 2/1980 | Panetti |
| 4,416,091 | A | * | 11/1983 | Panetti ........................ 451/347 |
| 4,492,059 | A | * | 1/1985 | Panetti ........................ 451/347 |
| 4,583,327 | A |   | 4/1986 | Jaeggi |
| 4,584,798 | A |   | 4/1986 | Rivoire |
| 4,615,150 | A | * | 10/1986 | Panetti ........................ 451/347 |
| 4,622,781 | A |   | 11/1986 | Vieau et al. |
| 4,829,723 | A |   | 5/1989 | Bull et al. |
| RE32,979 | E | * | 7/1989 | Panetti ......................... 451/65 |
| 4,862,647 | A |   | 9/1989 | Vieau |
| 5,044,126 | A |   | 9/1991 | Baldo |
| 5,067,283 | A |   | 11/1991 | Pomikacsek |
| 5,086,591 | A |   | 2/1992 | Panetti |
| 5,134,808 | A |   | 8/1992 | Panetti |
| 5,293,718 | A |   | 3/1994 | Favaron |
| 5,359,815 | A | * | 11/1994 | Schrunk et al. ............. 451/347 |

(Continued)

*Primary Examiner*—Hadi Shakeri
(74) *Attorney, Agent, or Firm*—Patterson, Thuente, Skaar & Christensen, P.A.

(57) ABSTRACT

A system for the grinding of unencumbered and encumbered sections of rail includes a locomotive that pulls a first and a second grinding module. The first grinding module is movable between a first and a second position. In the first position, the first grinding module is presented at angle enabling grinding of unencumbered section of rail while in the second position, the first grinding module is presented at an able enabling grinding of the encumbered section of rail. The locomotive continues in non-stop forward motion while the first grinding module is moved back and forth between its first and second positions. The second grinding module is generally used only for grinding of encumbered rail sections and is used simultaneously with the first grinding module in its second position.

8 Claims, 9 Drawing Sheets

U.S. PATENT DOCUMENTS

5,437,233 A    8/1995  Richter
6,033,166 A *  3/2000  Hampel ..................... 409/175

6,033,291 A    3/2000  Mathison et al.

* cited by examiner

METHOD AND APPARATUS FOR NON-INTERRUPTED GRINDING OF RAILROAD CROSSING AND MAIN LINE TRACK

CLAIM TO PRIORITY

The present application claims priority to U.S. Provisional Application No. 60/345,288, filed Oct. 25, 2001, and entitled "METHOD AND APPARATUS FOR NON-INTERRUPTED GRINDING OF RAILROAD CROSSING AND MAIN LINE TRACK." The identified provisional application is hereby incorporated by reference in its entirety.

FIELD OF THE INVENTION

The present invention relates to rail maintenance for railroad rails and, more particularly, to an apparatus and method for the continuous grinding and re-profiling of the working surface (railhead) of a rail including the switch and crossing sections of a rail.

BACKGROUND OF THE INVENTION

Rails in both railroad and light rail (typically, inner-metropolitan transport for persons) applications are subject to wear by the passage of trains over the rails. In particular, depressions in the upper surface of a rail may develop such that the railhead presents an undulating, corrugated surface. Moreover, the rail may develop burrs and cracks, or otherwise lose its symmetrical profile (the profile that is transverse to the rail longitudinal axis). Maintenance of a smooth running surface on the railhead of a rail for railroad and light rail applications is important for reasons of safety, riding comfort, noise suppression, reduced maintenance of the track and track bed, and protection of the track, track bed and rolling stock.

Grinding machines for maintaining the railhead of rails in smooth, properly shaped condition are known. Such grinding machines generally comprise a plurality of rotatable grinding modules carried on a grinding vehicle and pulled by a locomotive or the like, and disposed in close proximity to the railhead surface of the rail. The grinding modules include rotatable, abrasive grinding stones that can be lowered into a position where a portion of the grinding stone bears on the rail surface. The grinding stones then grind and restore the surface of the railhead to a smooth properly profiled configuration.

Figure 1A:
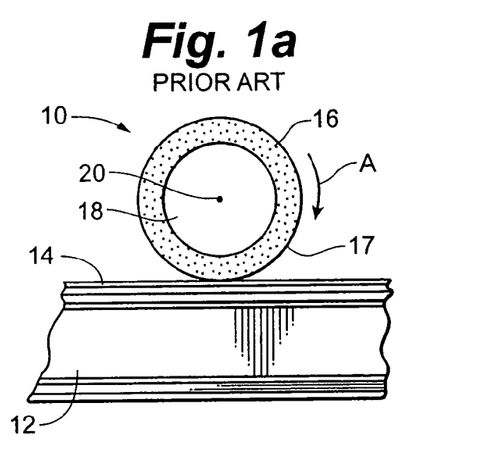
FIG. 1a is a side elevational view of a prior art grinding stone performing Type I surfacing on a rail.
Figure 1B:
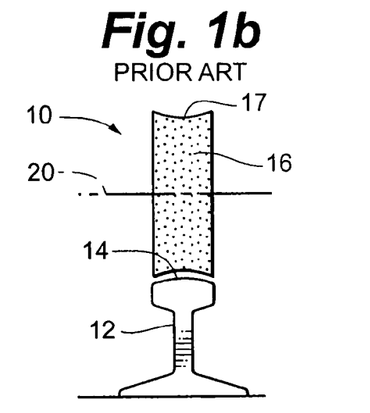

In the past, there have been two types of grinding, commonly referred to as Type I and Type II. Type I grinding is as depicted in the prior art figures, FIG. 1a and FIG. 1b. As depicted, a grinding stone 10 is positioned on the railhead surface 14 of the rail 12. The grinding stone 10 is preferably approximately ten inches in diameter having a layer of grinding material 16 formed circumferential to a backing plate or hub 18. The grinding stone rotates about axis 20 as indicated by Arrow A in FIG. 1a. The grinding stone 16 rotates in a plane that is substantially coplanar with a vertical plane passed through the longitudinal axis of the rail 12. Type I grinding provides for surface grinding of the railhead. The grinding is moved in a longitudinal direction with the rail by advancing the carrying grind car along the rail 12. Over time, the circumferential grinding surface 17 of the stone "dresses" to the rail, taking the shape of the railhead profile as depicted in FIG. 1b.

Figure 2A:
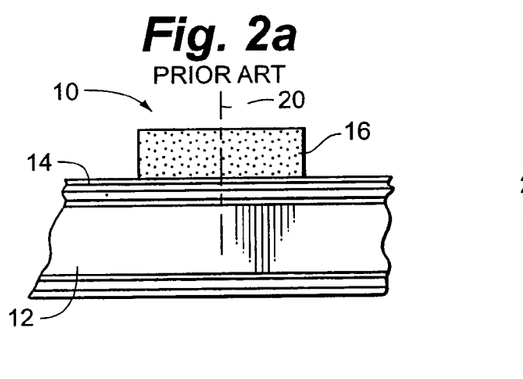
FIG. 2a is a side elevational view of a prior art grinding stone in a generally horizontal disposition performing Type II profiling on a rail.
Figure 2B:
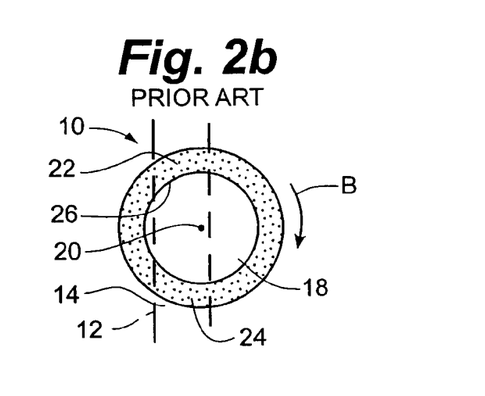

Type II grinding is utilized to profile the railhead of the rail. Profiling of a rail is accomplished by tilting the grinding module, and in particular, tilting the grinding stone 10 relative to the railhead 14 of the rail 12. Type II grinding is depicted in the prior art FIGS. 2a–2c. As depicted in FIGS. 2a and 2b, the grinding stone 10 is tilted in a more generally horizontal disposition, as compared to the vertical disposition of Type I grinding. Rotation of the grinding stone 10 is about axis 20 as indicated by Arrows B in FIGS. 2a and 2b. In Type II grinding, the grinding is performed such that the inner diameter 26 of the abrasive layer 16 is located generally over the railhead 14. Such grinding generates two potential contact areas 22, 24 in which the abrasive layer 16 may be in contact with the railhead 14 of the rail 12. At the contact areas 22, 24, the abrasive of the abrasive layer 16 is moving in a generally transverse direction to the longitudinal axis of the rail 12. Thus, the grinding surface of the abrasive layer 16 remains a flat surface and grinds a flat facet on the curved railhead surface 14.

Figure 2C:
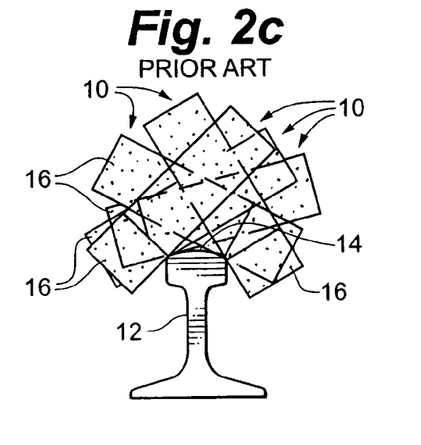
FIG. 2c is an end-on elevational view of a plurality of prior art grinding stones oriented at differing angles with respect to the rail in order to perform Type II profiling of the railhead, each grinding stone grinding a different facet on the railhead.

In practice, as depicted in FIG. 2c, the profile of the railhead surface 14 of the rail 12 is re-profiled by a plurality of grinding stones 10 each set at a different angle with respect to the railhead 14 and each grinding a relatively small facet of the profile of the railhead 14. In some prior art devices, as many as one hundred grinding stones are utilized to re-profile the railhead 14 of the rail 12.

Examples of Type II rail grinding machines having tiltable grinding modules include U.S. Pat. No. 4,622,781 to Vieau et al. (assigned to the assignee of the present invention), U.S. Pat. No. 4,178,724 to Bruno, U.S. Pat. No. 3,707,808 to Danko et al., U.S. Pat. No. 3,606,705 to Rivorire, U.S. Pat. No. 2,197,729 to Miller, and U.S. Pat. No. 2,132,470 to Hobson et al. Each of the above-identified patents is hereby incorporated by reference.

A problem with Type I grinding is that it necessarily must be performed at relatively low revolutionary speed of the grinding stone 16. When using a relatively large diameter stone, such speed is typically in the range of 600–650 rpm. The Type I grinding results in longitudinal scratch pattern being formed in the railhead surface 14. Further, due to slight imbalance of the grinding stone 16, chatter marks having a relatively long wavelength are frequently defined in the railhead surface 14. Such chatter marks are undesirable because they increase the noise of a vehicle riding on the rails 12 and increase noise and vibration in a rail car that is supported on wheels as the wheels pass over the chatter marks. The wavelength of the chatter marks is directly related to the rotational speed of the grinding stone 16 and the rate of advance of a grinding vehicle that carries the grinding module, a relatively slow rotational speed in combination with relatively slow speed of advance generating relatively long wavelength chatter marks.

Type II grinding is normally done at a much higher revolving speed, typically in the range of 3,000–3,600 rpm. Such high rotational speed results in chatter marks being defined on the surface of the railhead that have a much shorter wavelength than is normally experienced with Type I grinding. The short wavelength of the Type II grinding chatter results in such chatter being relatively imperceptible from an increased noise and increased vibration standpoint. A problem that occurs with Type II grinding, however, is the fact that when such grinding is complete, the profile of the surface of the railhead is defined by a plurality of facets. It would be preferable if the surface 14 of the railhead was formed of a continuous smooth profile.

An additional problem arises with respect to re-profiling the switching and crossing (S&C) sections of a rail. An example of an S&C section of a rail is depicted in the prior art figure of FIG. 3. Unlike the railroad rail 12, depicted in FIGS. 1 and 2, the S&C section 30 of a rail presents a gage (inner) side and a field (outer) side that is encumbered by pavement 40, planks, and/or other material so as to present a generally uninterrupted horizontal surface to facilitate pedestrian traffic and automobile traffic over the S&C section 30.

Figure 3:
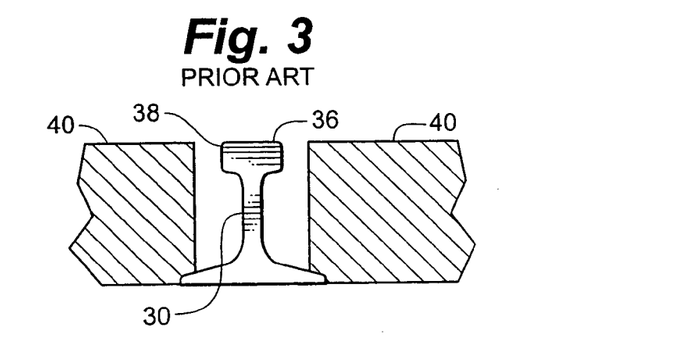
FIG. 3 is an end-on elevational view of a prior art S&C rail section disposed between pavement or planks.

A difficulty with profiling the S&C section 30 using the Type II grinding as described above, arises when attempting to profile the gage shoulder 36 and the field shoulder 38. When a grinding stone 10 is disposed at a large included angle with respect to the S&C section 30 in order to profile the gage shoulder 36, the outer circumference of the grinding wheel 10 comes into contact with the nearby pavement 40.

The current practice in dealing with the S&C sections of a rail is to bypass them when the grinding and re-profiling of the remaining portion of the rail is performed, e.g., a company providing grinding services to a railway client lifts its grinding heads and stops its pass mile odometer as it passes over an S&C section. The railway client must then contract with a party to independently maintain the S&C sections or must provide their own maintenance crews/pilots for the S&C sections. Either choice is incurred at significant cost to the railway client and requires the use of an additional machine beyond that of the rail grinder, which presents its own maintenance problems including that of the oft-needed replacement of small diameter grinding stones, and which has the potential for having to stop traffic at the S&C section.

As such, there is a need for a machine and/or method that can both grind and re-profile unencumbered rails as well as encumbered rails, such as S&C rail sections. The machine and/or method preferably performs the desired tasks on a continuous basis along the rail without having to stop or return to address the unique situation presented by an encumbered rail.

SUMMARY OF THE INVENTION

The needs described above are in large measure met by the method and apparatus for non-interrupted grinding of a railroad crossing and main line track of the present invention. Specifically, the present invention provides for a system for the grinding of unencumbered and encumbered sections of rail. The system generally includes a locomotive that pulls a first and a second grinding module. The first grinding module is movable between a first and a second position. In the first position, the first grinding module is presented at an angle enabling grinding of unencumbered section of rail while in the second position, the first grinding module is presented at an angle enabling grinding of the encumbered section of rail. The locomotive continues in non-stop forward motion while the first grinding module is moved back and forth between its first and second positions. The second grinding module is generally used only for grinding of encumbered rail sections and is used simultaneously with the first grinding module in its second position.

The second grinding module preferably presents a grinding stone at an angle of 10 to 45 degrees relative to the encumbered section of rail. The movement of the first grinding module from the first to second position includes lifting the first grinding module from the unencumbered section of rail, adjusting the angle of the first grinding module and replacing the first grinding module on unencumbered section of rail, just prior to reaching the encumbered section of rail. The adjustment of the angle of the first grinding module or the second grinding module may be performed manually or automatically through use of a programmed control system. The first grinding module preferably utilizes a grinding stone possessing a flat grinding surface while the second grinding module preferably utilizes a stone posses a concave grinding surface. When grinding, the stone of the first grinding module may extend past the gage or field shoulder of the unencumbered rail, however, when grinding an encumbered section of rail the stone of the first grinding module is preferably maintained within the boundary defined by the gage or field shoulder of the encumbered section of rail. By using multiple types of grinding modules, that allow for the grinding of both unencumbered and encumbered sections of rail, the system enables non-stop, charge per pass mile billing for the grinding of the railroad track.

A method of the present invention for the uninterrupted grinding of a railroad track, which has both unencumbered and encumbered sections of rail, includes the steps of: 1) grinding the unencumbered section of rail with a first grinder at a first angle; 2) repositioning the first grinder to a second angle; 3) grinding the encumbered section of rail with the repositioned first grinder; and 4) grinding the encumbered section of rail with a second grinder that grinds substantially simultaneously with the first grinder. Each of the above steps is performed while the first grinder and the second grinder are moved in a continuous forward motion, such as by a locomotive.

The present invention also comprises a billing system for railroad track grinding, where the railroad track includes sections of unencumbered and encumbered sections of rail. The system generally includes a first grinder, a second grinder, an odometer, and a bill-generating system. The first grinder grinds both the unencumbered and encumbered sections of rail by moving between a first and second position, respectively. The second grinder grinds the encumbered section of rail substantially simultaneously with the first grinder in its second position. The odometer measures the non-stop distance that is traveled by the first and second grinders over the railroad track. The bill-generating system generates a bill based on the nonstop distance measured by the odometer.

The present invention further comprises a method of billing for railroad track grinding, where the railroad track includes both unencumbered and encumbered sections of rail and where the grinding of the rail occurs on a continuous, non-stop basis over all sections. The method includes the steps of measuring the non-stop distance traveled by the grinder performing the grinding over all sections of rail; and generating a bill based on the non-stop distance measured.

BRIEF DESCRIPTION OF THE DRAWINGS

FIG. 1b is an end-on elevational view of the prior art grinding stone of FIG. 1a;

FIG. 2b is a top plan form view of the prior art grinding stone of FIG. 2a;

DETAILED DESCRIPTION OF THE PREFERRED EMBODIMENTS

Figure 4:
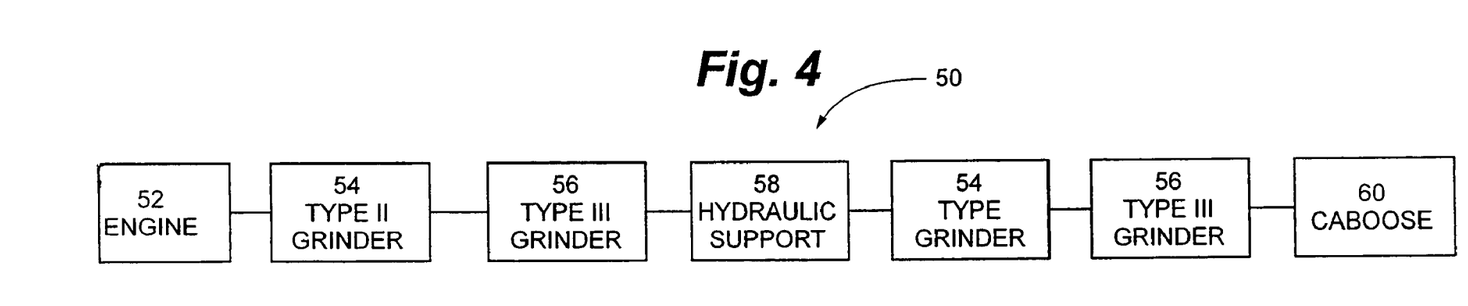
FIG. 4 is a block diagram representation of a locomotive grinding machine of the present invention.

The present invention provides for the grinding and profiling of a rail, including its switch and crossing sections, through the use of a single locomotive grinding machine. An example configuration of a locomotive grinding machine 50 of the present invention is depicted in FIG. 4. As shown, grinding machine 50 incorporates a locomotive engine 52, at least one Type II grinder 54, and at least one Type III offset grinder 56. Additional Type II, or Type III grinders 54 and 56, respectively, may be included as appropriate to a specific grinding application, and as well, a locomotive hydraulic support car 58, a caboose 60, or additional engine 52 may be added as appropriate. The elements of the locomotive engine 52, locomotive hydraulic support car 58, and caboose 60 are well known in the art and will not be described in detail herein.

Figure 5:
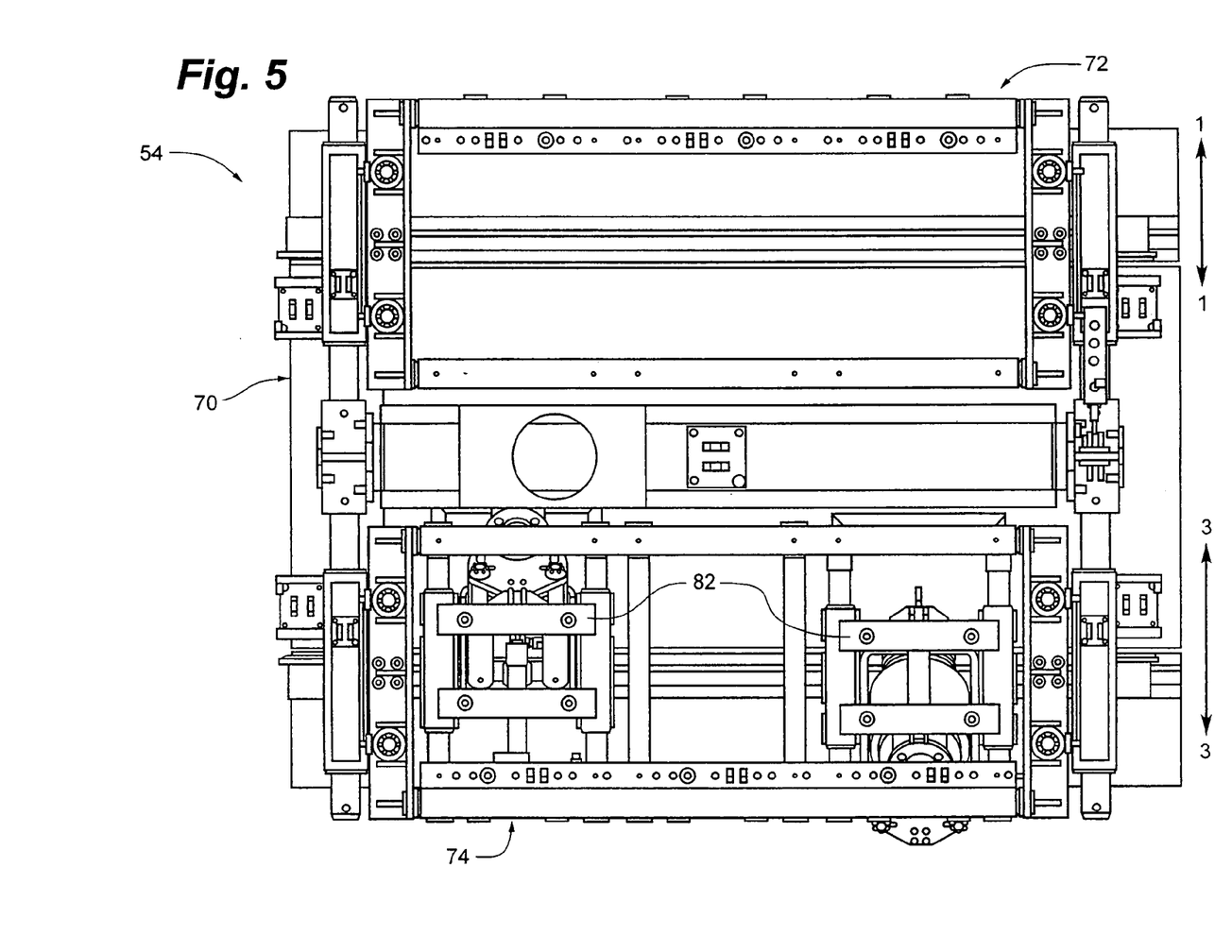
FIG. 5 is a top plan view of a split-rail carriage assembly that provides for Type II grinding.
Figure 6:
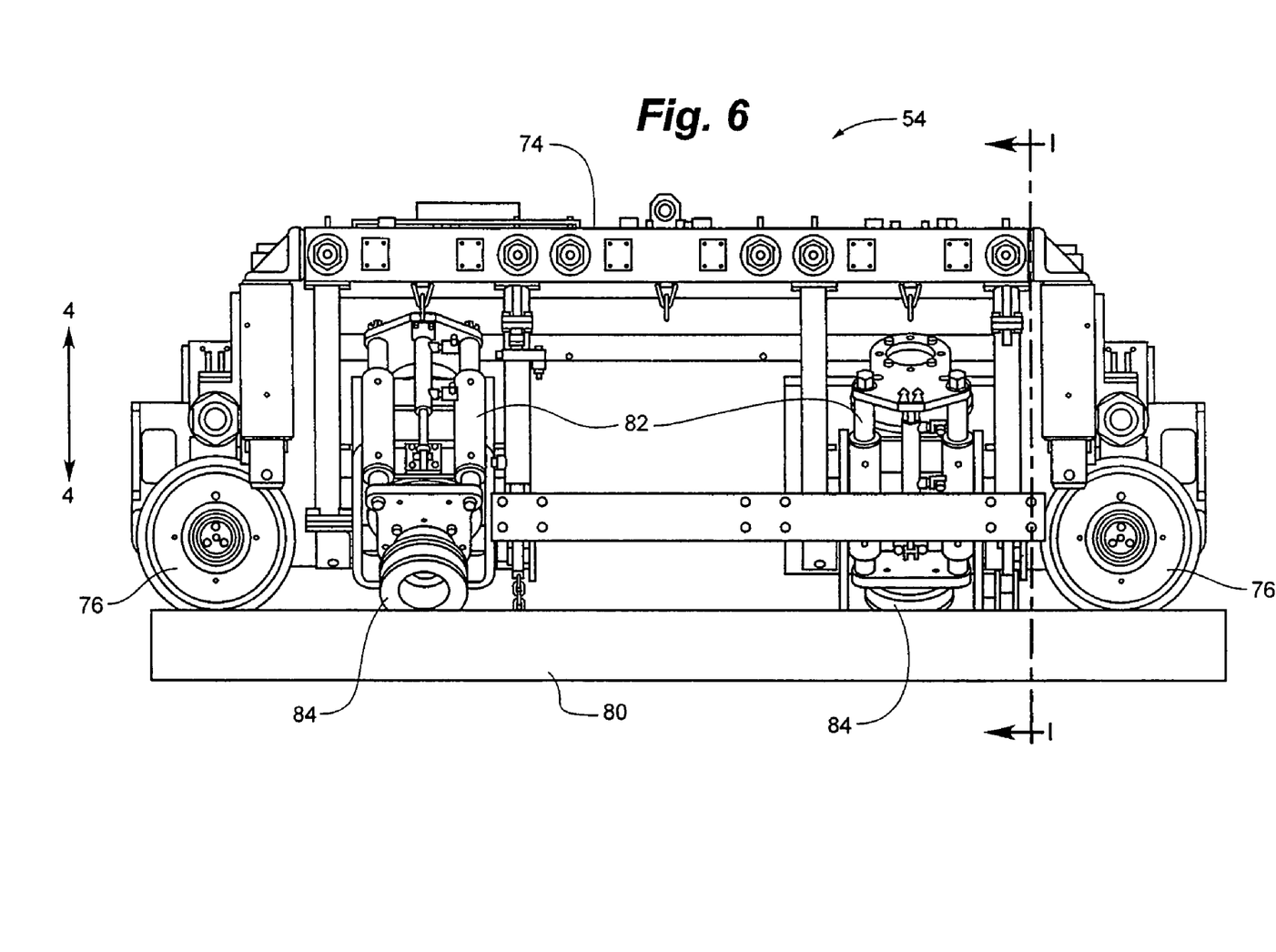
FIG. 6 is a side elevational view of the carriage assembly of FIG. 5 as shown from the Type II grinding side.
Figure 7:
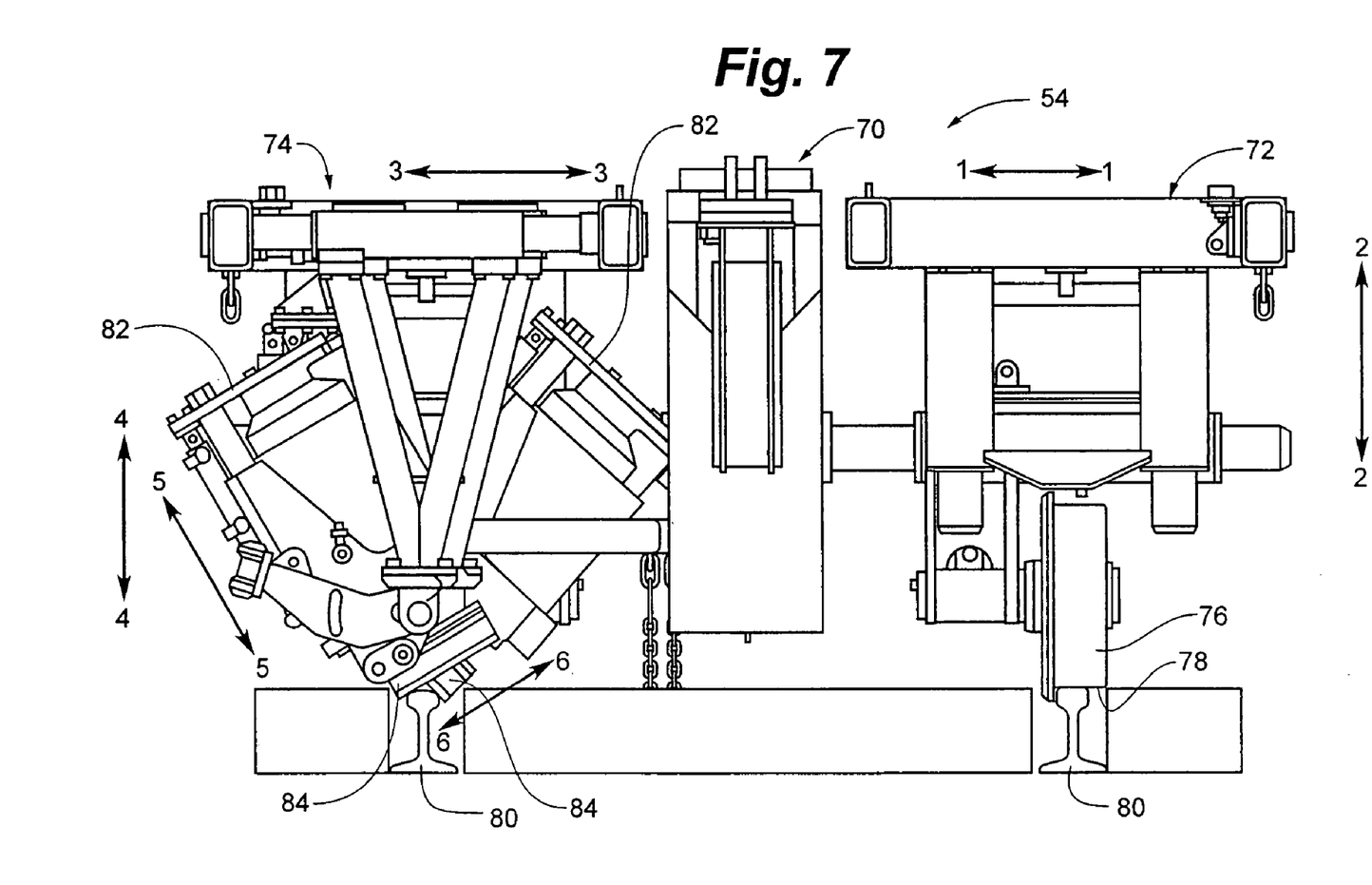
FIG. 7 is a cross-sectional view of the carriage assembly taken along line I—I of FIG. 6.

Referring to FIGS. 5–7, one preferred embodiment of Type II grinder 54 is shown. Grinder 54 is comprised of a split-rail carriage assembly 70 that includes a non-grinding buggy 72 and a Type II buggy 74, the carriage assembly 70 is supported by a main frame having rail engaging wheels 76 (refer to U.S. Pat. No. 4,829,723, hereby incorporated by reference, for a depiction of a main frame and rail engaging wheels). The non-grinding buggy 72 provides for a rail engaging wheel 76 riding upon railhead surface 78 of the rail 80 to balance Type II buggy 74. That portion of carriage assembly 70 that supports wheel 76 is laterally adjustable relative rail 80 as indicated by motion line 1—1 in FIGS. 5 and 7 and, as well, is vertically adjustably relative rail 80 as indicated by motion line 2—2 in FIG. 5. The longitudinal position of wheel 76 is preferably stationary.

The Type II buggy 74 of carriage assembly 70 provides a plurality of Type II grinding modules 82. The portion of carriage assembly 70 that supports Type II buggy 74 is laterally adjustable relative rail 80 as indicated by motion line 3—3, per FIGS. 5–7, and vertically adjustable relative rail 80 as indicated by motion line 4—4 per FIGS. 6 and 7. The grinding modules 84 themselves are independently vertically and laterally adjustable and, as well, may be tilted to provide grinding stone 84 at a substantially tangential orientation to rail 80, see motion lines 5—5 and 6—6 in FIG. 7. At the contact area of grinding stone 84 to rail 80, grinding stone 84 moves in a generally transverse direction, via the advancing position of the carrying locomotive 50, to the longitudinal axis of rail 80. Thus, the grinding surface of grinding stone 84 remains a substantially flat surface and grinds a flat facet on the curved railhead surface. A plurality of grinding stones 84 are preferably used to create the desired rail profile, each of grinding stones 84 grinding a small facet of the profile. In the instance of Type II grinding module 82, the lateral, vertical, and tilting motions are performed automatically without manual intervention via controlled hydraulic systems.

It should be noted that while grinder 54 as described above includes only Type II grinding modules 82, grinder 54 may be alternatively configured with additional and/or other types of grinding modules, e.g., a Type III grinding module (described below), without departing from the spirit or scope of the invention.

Figure 8:
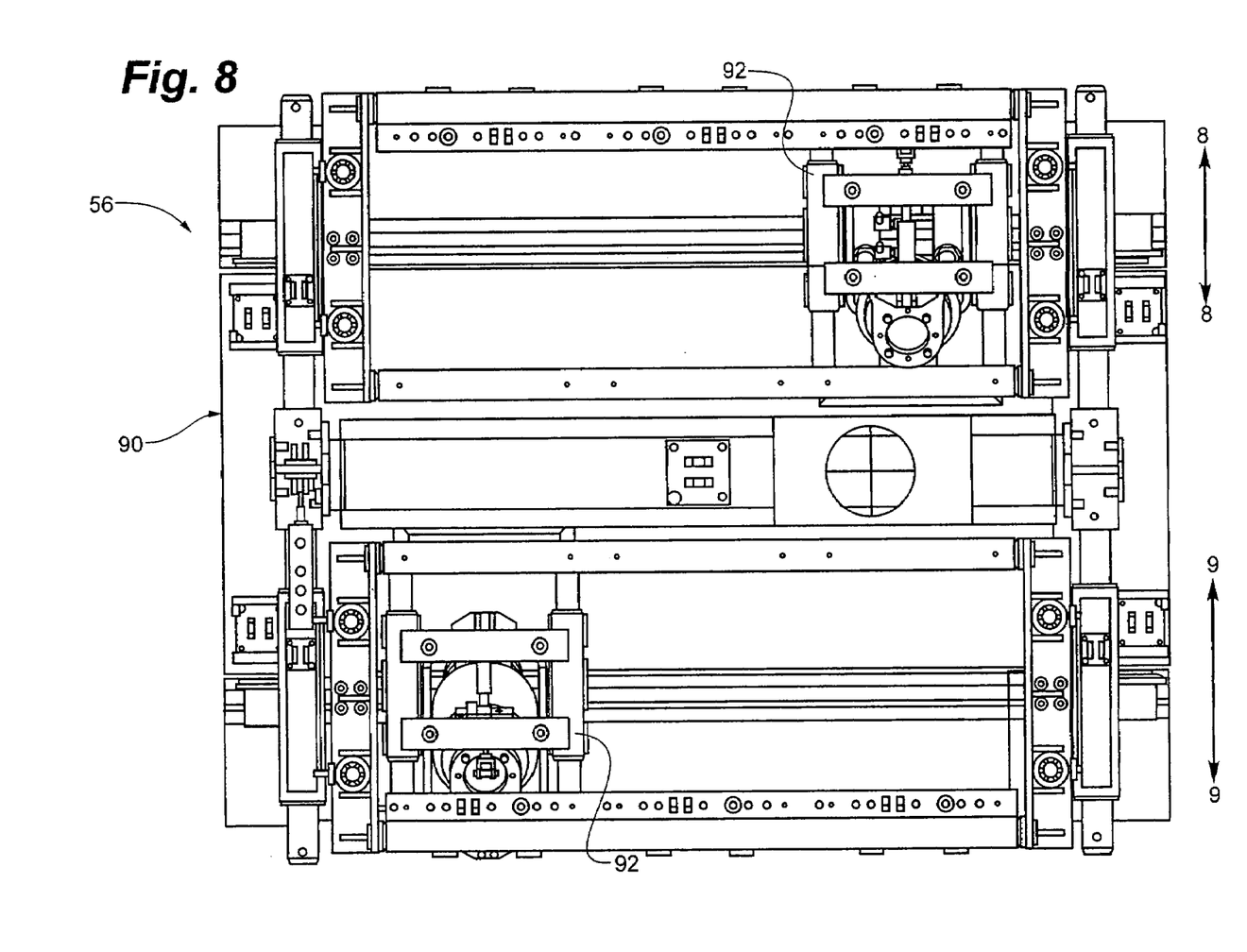
FIG. 8 is a top plan view of a split-rail carriage assembly that provide for Type III grinding.
Figure 9:
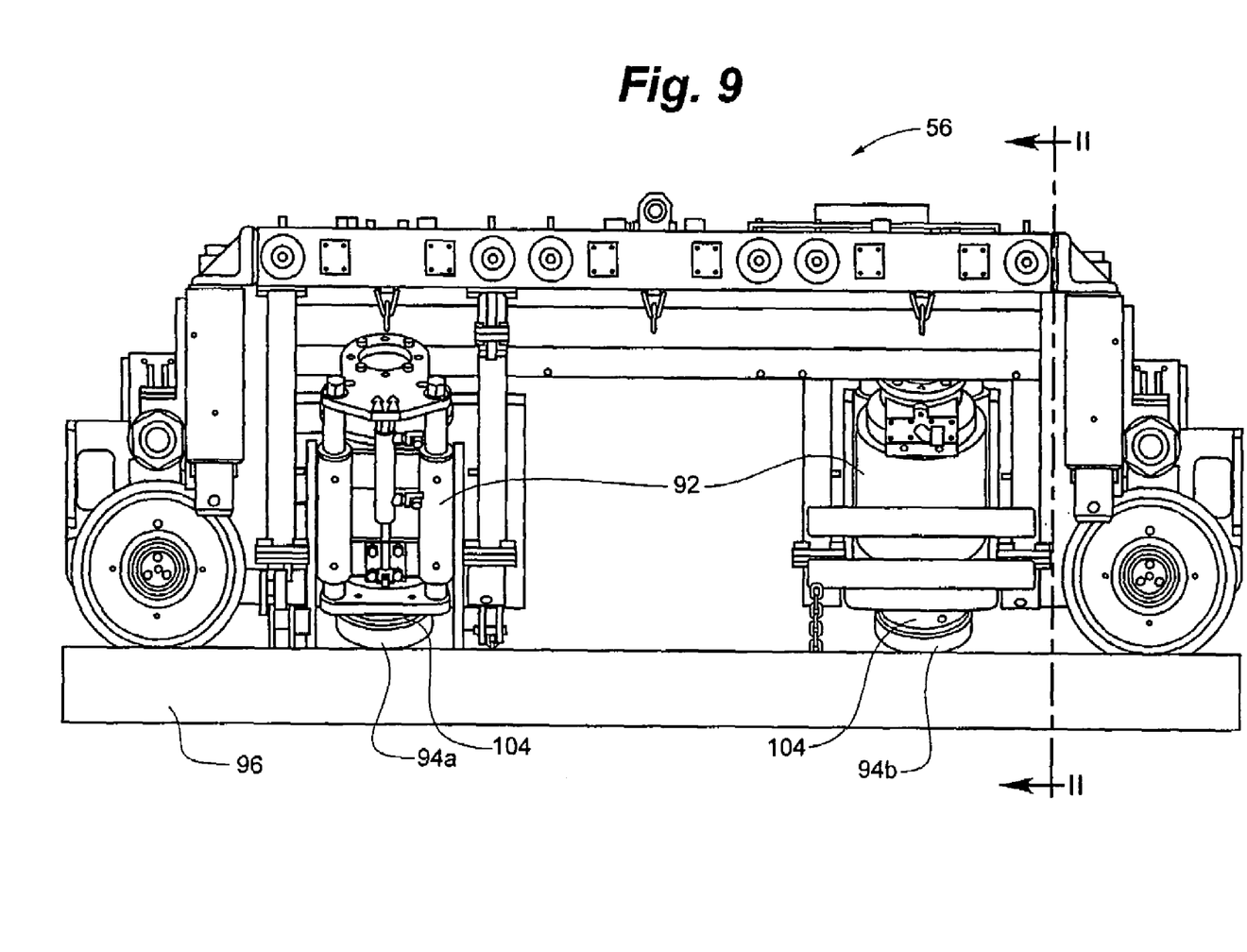
FIG. 9 is a side elevational view of the carriage assembly of FIG. 8.
Figure 10:
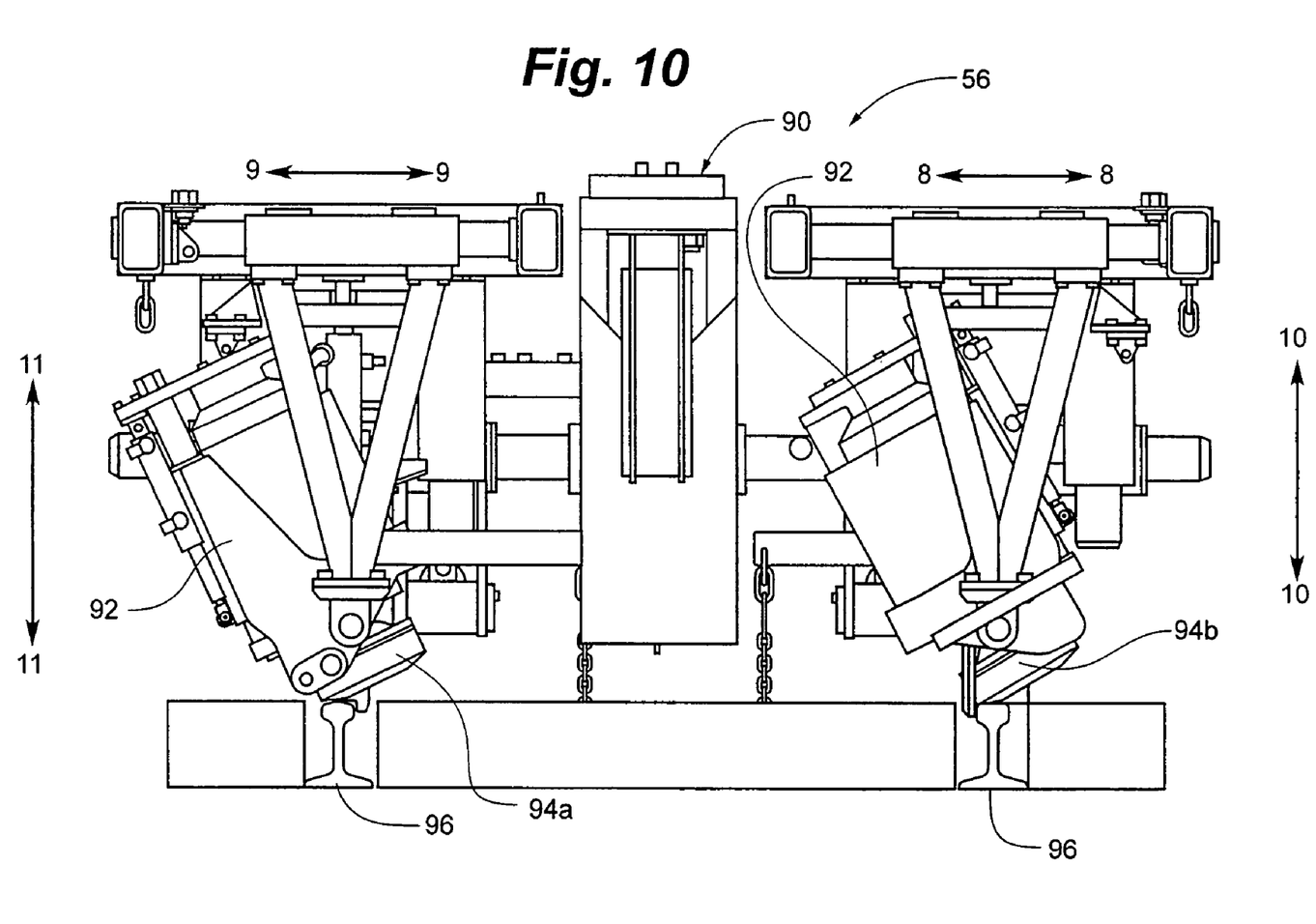
FIG. 10 is a cross-sectional view of the carriage assembly taken along line II—II of FIG. 9.

Referring to FIGS. 8–10, one preferred embodiment of a Type III offset grinder 56 is shown. Grinder 56 is comprised of a split-rail carriage assembly 90 that includes a plurality of Type III grinding modules 92, the carriage assembly 90 is supported by a main frame having rail engaging wheels. In this instance, there is one module 92 per side of carriage assembly 90, however, more modules 92 may be provided per side without departing from the spirit or scope of the invention. Each side of carriage assembly 90 is individually, laterally adjustable per motion lines 8—8 and 9—9 and, as well, vertically adjustable per motion lines 10—10 and 11—11. Type III grinding modules 92 are likewise independently vertically and laterally adjustable, and provide an additional degree of freedom through its ability to tilt and thereby tilt the grinding stone 94 (94a and 94b). This additional degree of freedom enables grinding modules 92 to place grinding stone 94 (94a and 94b) at an offset orientation to the rail 96 thereby avoiding contact with any nearby pavement or planks that may be found in a switch, crossing, or other encumbered section of rail. Type III grinding module 92 is preferably manually adjusted and can be configured to support a Type II grinding stone 84.

Figure 11:
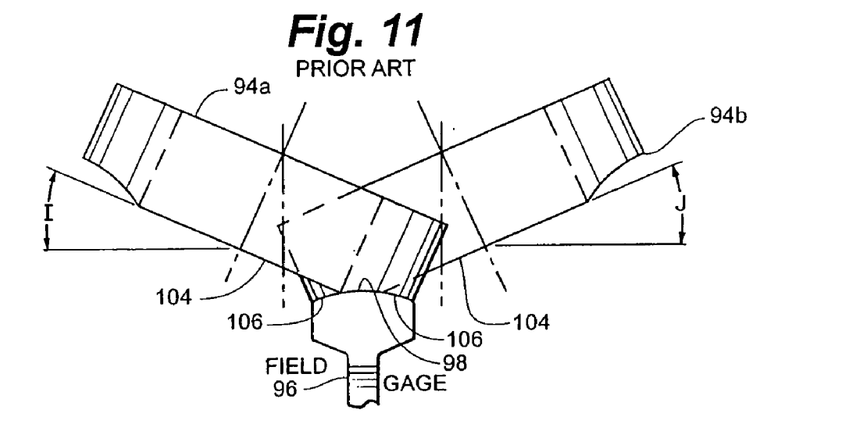
FIG. 11 is an end-on elevational view of two grinding stones of the present invention as depicted in FIG. 10 disposed to profile the railhead of a railroad rail.
Figure 12:
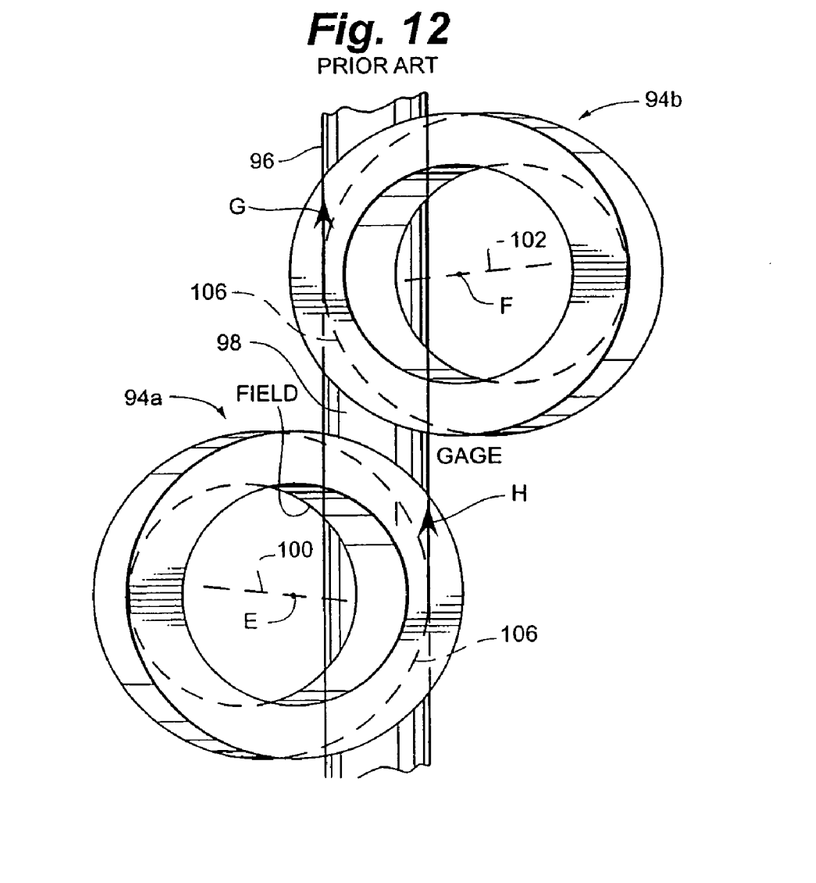
FIG. 12 is a top plan view of the two grinding stones of FIG. 11 posed over the railhead with the respective backplates of the grinding stones removed for clarity.

FIG. 11 depicts the cooperative profiling of the grinding stones 94a, 94b depicted in FIG. 10 to effect a grinding of the railhead 98 of rail 96. However, note that grinding stone 94b has been tilted to the opposite direction in FIG. 10 to illustrate how each side of the rail is ground. Specifically, the grinding stone 94a is utilized to profile the gage side portion of the railhead 98 and grinding stone 94b is utilized to re-profile the field side portion of the railhead 98. As depicted in FIGS. 11 and 12, a vertical line E passed through the center axis 100 of the grinding stone 94a is offset from the rail 96 on the field side. Likewise, a vertical line F passed through the center axis 102 of the grinding stone 94b is offset from the rail 96 on the gage side. In FIG. 12, the tangents G and H to the path of rotation of the grinding stones 94a, 94b are parallel to the longitudinal axis of the rail 96.

The difference in the angle of approach of the grinding stones 94a, 94b with respect to the railhead 98 is depicted in FIGS. 11 and 12. Grinding stone 94a for grinding on the gage side portion of the railhead 98 is operated at an included angle I between the horizontal and a line parallel to the backing plate 104 that is between 15° and 45°. In a preferred embodiment, the grinding stone 94a is operated at an acute included angle I of 35°.

Grinding stone 94b is generally operated at a steeper angle with respect to the horizontal for grinding the field side portion of the railhead 98. Grinding stone 94b is operated at an included angle J defined between a line parallel to the plane of the backing plate 104 and the horizontal of between 10° and 45°. In a preferred embodiment, grinding stone 94b is operated at an included angle J of 20°.

Grinding stones 94a and 94b preferably provide a grinding surface 106 that is both beveled and radiused to present a concave surface 106 that is formed to generally conform to the desired profile of the railhead 98 (additional detail regarding the structure and use of a Type III offset grinder may be found in U.S. Pat. No. 6,033,291, which is hereby incorporated by reference).

In operation, grinding machine 50 is utilized to maintain a substantially continuous grinding scheme along main line track, i.e., unencumbered track, and encumbered railroad track such as switch and crossing sections. This operation is preferably performed by utilizing Type II grinding, Type III grinding, or a combination thereof along the unencumbered track as desirable and appropriate. As machine 50 approaches the encumbered section of the track such as a road crossing, the Type II grind modules 82 are lifted for a predetermined time span to allow the modules 82 to be shifted laterally to allow the modules 82 to come to an offset orientation. Then the modules 82 are sent back down in an offset condition before the onset of the crossing. Then, both the Type II and Type III modules, 82 and 92 respectively, are utilized in an offset fashion during the grind through the encumbered section of the track, such as the crossing. During this grinding process, the Type II grinding stones 84, even though they are not shaped to the rail profile like the regular Type III stones 94, still produce substantially different grind marks on the rail and avoid grinding or damaging the adjacent non-rail pieces of the track support structure. After passing through the crossing, the process is reversed so that the Type II grind modules 82 go back to grinding in Type II fashion and continue to grind the rest of the rail section. The modules are lifted for a brief period for the carriage shift to happen so that the module 82 can come back down and grind in a Type II fashion.

All of these functions are accomplished by PLC controlled computers. Still, the operator has to sense the approaching encumbrance such as a switch or a crossing and trigger the events by pressing a control switch that tells the computer to control the sequence of events in the fashion described above. Many variations of the specific form in which the grinding is accomplished in the crossing section are possible. The above-described is one way of accomplishing the grinding in the encumbered section of the rail track, using the Type III grinding technique.

Via this mode of operation, the operator of grinding machine 50 can establish a billing scheme that is different from the traditional manner of billing. The traditional manner of billing for the grinding of rails utilizes a charge per pass mile, as measured by an odometer on the grinding machine with the actual bill typically produced by a computerized billing system. The odometer generally stops as the grinding machines passes over those encumbered sections of rail that require special attention and equipment. However, with grinding machine 50 of the present invention, the operator of the grinding machine may continue to bill at a charge per pass mile, increasing the number of pass miles by not having to stop the odometer when passing over an encumbered section of rail, and may also bill a crossing fee or encumbered rail section fee for the grinding performed thereon. Thus, even though additional fees may be charged due to the continuous nature of the rail grinding scheme by grinding machine 50, the ability to use grinding machine 50 for all sections of a rail reduces overall maintenance cost to the rail owner by reducing the amount of equipment as well as pilots/crews that are necessary to maintain encumbered sections of rail.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A system for uninterrupted grinding and profiling of a railroad track equipped with first and second rails, each rail having a railhead presenting a generally arcuate cross-sectional profile extending in a transverse direction between a gage side portion and a field side portion of the railhead, wherein said railroad track includes an unencumbered section of rail and an encumbered section of rail, said system comprising:

a locomotive having a forward motion relative to said railroad track in a first direction substantially parallel to said first and second rails and substantially perpendicular to said transverse direction;

a first grinder pulled by said locomotive, the first grinder having a plurality of variable grinding modules for independently rotating and positioning a plurality of Type II grinding stones relative to the railhead, each variable grinding module having an offset adjustment mechanism, wherein the plurality of variable grinding modules cooperatively grind the entire generally arcuate cross-sectional profile of the railhead when the first grinder encounters unencumbered sections of rail and wherein the offset adjustment mechanism individually offsets each variable grinding module so as to avoid grinding a rail shoulder when the first grinder encounters encumbered sections of rail whereby the offset adjustment mechanism adjusts each variable grinding module without interrupting the forward motion of the locomotive; and a second grinder having a plurality of fixed offset grinding modules for independently rotating and positioning a plurality of Type III grinding stones relative to the railhead, each fixed offset grinding module vertically positioning each Type III grinding stone at one of a first non-contacting position corresponding to unencumbered sections of rail and a second contacting position corresponding to encumbered sections of rail, whereby a concave grinding surface grinds a rail shoulder profile in the second contacting position, and whereby each fixed offset grinding module is vertically positionable without interrupting the forward motion of said locomotive.

2. The system of claim 1, wherein each fixed offset grinding module presents each Type III grinding stone at an angle of 10 to 45 degrees relative to said encumbered section of rail.

3. The system of claim 1, wherein the movement of said offset adjustment mechanisms relative to the first railhead includes lifting said Type II grinding stones from said unencumbered section of rail, offsetting each variable grinding module then lowering said Type II grinding stones at an offset angle to said unencumbered section of rail in preparation of crossing said encumbered section of rail.

4. The system of claim 1, wherein said Type II grinding stones make tangential contact with said rail, and wherein said Type II grinding stones extend beyond a field or gage shoulder of said rail when each variable grinding module encounters unencumbered sections of rail, and wherein said Type II grinding stones remain within said field or gage shoulder of said rail when each variable grinding module encounters encumbered sections of rail.

5. The system of claim 1, wherein said variable grinding modules are automatically adjustable to position the Type II grinding stones at an offset orientation to the rail ranging from a first and second gage side offset angle for grinding the gage side portion of the railhead and a first and second field side offset angle for grinding the field side portion of the railhead.

6. The system of claim 1, wherein the locomotive comprises an odometer for measuring the forward motion of the locomotive with respect to the railroad track, the odometer measuring the forward motion for both unencumbered sections and encumbered sections of rail.

7. The system of claim 6, wherein the odometer supplies the measured forward motion of the locomotive to a computerized billing system, the computerized billing system generating a maintenance bill based on an amount of rail grinded including both unencumbered sections and encumbered sections of rail.

8. The system of claim 7, wherein a grinding bill rate is different for grinding an encumbered section of rail versus an encumbered section or rail.

* * * * *